Sept. 6, 1960     A. GRUGET     2,951,676
BALANCED VALVE
Filed April 10, 1957
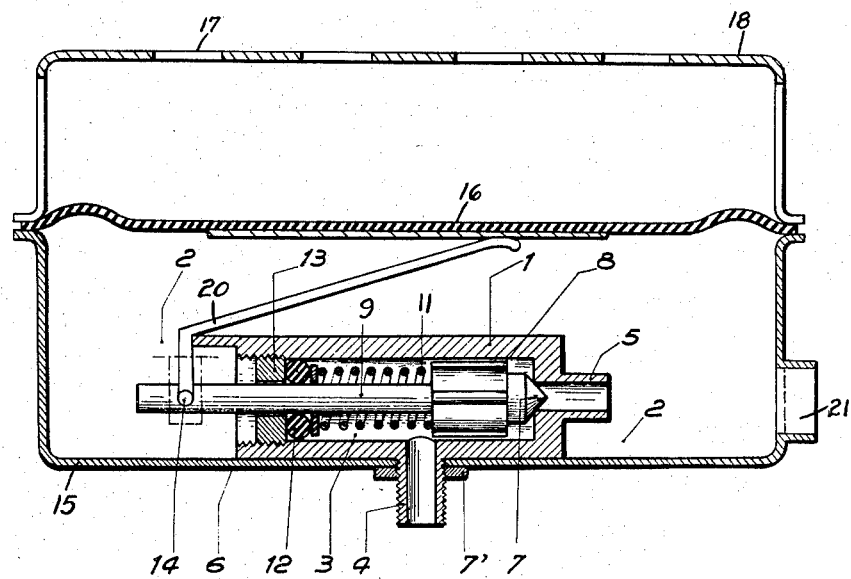
INVENTOR
ANDRE GRUGET
BY Stone Mack.
ATTORNEYS

United States Patent Office 2,951,676
Patented Sept. 6, 1960

2,951,676

BALANCED VALVE

André Gruget, Meudon, France, assignor to La Spirotechnique, Paris, France

Filed Apr. 10, 1957, Ser. No. 651,861

Claims priority, application France Apr. 12, 1956

2 Claims. (Cl. 251—144)

The present invention has for its object a balanced valve, applicable in a very general manner, but however more specially devised to be used as a valve for supplying air or other breathable gas, in breathing apparatus and, still more specially, in the breathing apparatus for autonomous divers.

By balanced valve it is intended to designate a valve the reactions of which on its operating members are independent of the pressure of the gas of which it controls the flow. The balanced valve according to the present invention answers to that definition but, in addition, it applies to its operating means only reduced passive resistances, and its construction is easy and cheap with a reliable operation. It is, in a manner known per se, located in a valve body permanently connected to the source of the fluid the flow of which is to be controlled, and it opens in a direction opposed to the flowing of said fluid out of the valve body, but it is characterized in that the diameter of its rod is substantially equal to that of the orifice controlled by the valve and said rod projects from the valve box through at least a gas-tight toroidal gasket, for entering a recess in which the pressure is, when the valve is closed, equal to the pressure in the outlet passage controlled by the valve.

The single figure of the accompanying drawing shows in a longitudinal section, by way of example only, an embodiment of the balanced valve according to the invention, intended to be used in a breathing apparatus for autonomous divers.

In that application, the valve body 1 is intended to be secured inside the casing 15 of a pressure regulator in the recess of the latter adjacent to the diaphragm 16 which controls the valve. Said diaphragm is submitted on its inner surface to the pressure in the recess 2 of the pressure regulator and, on its outer surface, to the surrounding medium pressure, i.e. water in the case of a breathing apparatus for diving, said water having free access to its outer surface through holes 17 of a protective cover 18.

The valve body 1 is for instance constituted by a prismatic block bored so as to provide a recess 3 which communicates with an inlet tubular appendix 4 and a delivery tube 5. The body 1 is secured on the inner surface of the bottom 6 of the regulator casing, by means of a nut 7' or an equivalent member threaded on a thread of the appendix 4 inserted through a hole in the bottom 6. Said appendix is connected to a high pressure gas source, generally an air pressure cylinder.

The valve which, in the example contemplated, is a conical point 7, has its seat provided by the edge of the inner orifice of the delivery tube 5; it comprises a head 8, the cross-section of which is polygonal, and which is guided in the bore 3 and extended by an axial rod 9 which protrudes from the body 1 into the recess 2 of the pressure regulator. For ensuring the tightness of the recess 3 relatively to the recess 2 without creating passive resistances sufficiently important for reducing in an appreciable extent the operating sensitiveness of the valve, it is provided, according to the invention, around the rod 9 at its outlet from the recess 3, at least a toroidal gasket 10 of the type known as O ring, for instance. Such a gasket is normally, and independently of the pressure prevailing inside the recess 3, held in a compressed state for being applied against the peripheral surface of the rod 9 and the other adjacent surfaces, by a helical spring 11 interposed between the guiding head 8 and a washer 12, the gasket bearing against a ring 13 threaded in the body 1 and which constitutes one of the bottoms of the recess 3. It is not necessary to fit accurately the rod 9 in the ring 13; on the contrary it is advantageous to provide a small clearance for limiting the passive resistances to the reduced passive resistances created by the gasket.

When the valve 7 is closed the axial thrust on said valve due to the high pressure gas which fills the recess 3 is null if, according to the invention, the diameter of the rod 9 is equal to the inner diameter of the delivery tube 5. Inasmuch as the pressure inside the delivery tube 5 is equal to the pressure inside the recess 2 of the regulator, when the valve is closed, the valve is submitted only to the axial thrust of the spring 11 which acts for urging the valve towards its closed position. That thrust may be determined as desired; it may be also regulated by screwing or unscrewing the ring 13. The rod 9 is operatively connected to the regulator diaphragm 16 through a link system, such as a lever 20 having one end pivotally connected at 14. The delivery tube 5 may either open in the recess 2 provided with an outlet tubular opening 21 that being generally the case in the breathing apparatus of the kind set forth, or be connected to a pipe which opens near the entrance of the diver's respiratory tracts.

As soon as the valve 7 begins to open by moving apart from its seat, high pressure air flows from the inlet 4 to the outlet 5, the pressure gradually decreasing from the inlet 4 which is located up-stream relatively to the head 8, so that the air pressure on the rear surface, i.e. the left hand end surface of the head 8, is greater than the air pressure applied on the opposed end surface of said head. However, this latter surface is greater than the opposed one since the cross-sectional area of the rod 9 is to be substracted from the left hand end surface. It is always possible to determine the relative values of the cross-section of the head 8 and the rod 9, and the strength of the spring 11, so that the thrust on one of the side surfaces of said head will counterbalance the thrust on the other side surface, and the valve 7 will be balanced in all positions.

What I claim is:

1. A fluid handling system including a casing having a high pressure side and a lower pressure side, a valve in said casing for controlling the flow of gas from said high pressure side to said lower pressure side, said valve comprising: a hollow elongated body connected by a lateral inlet port to the high pressure side of the casing, and provided at its forward end with a cylindrical gas outlet port and at its rearward end with a cylindrical aperture, both opening into the low pressure side of said casing; a cylindrical rod within said body, of the same diameter as the gas outlet port, slidingly fitting into said aperture, and bearing at its forward end a member closing the cylindrical gas outlet port when the valve is in the closed position, and a guiding head behind said forward member, of such a shape to allow flow along its outer surface and between said guiding head and the inner surface of said hollow elongated body, and of such a cross-section relative to the cross-section of said rod that the gas pressure in the casing will not apply an axial thrust upon said head when the valve is in the open position.

2. A valve according to claim 1, and further comprising a toroidal gasket around said cylindrical rod, bearing against the rearward inner wall of said body, and a compression spring around said rod, interposed between the rearward end of said guiding head and said toroidal gasket and urging said gasket upon said rearward inner wall.

References Cited in the file of this patent
UNITED STATES PATENTS

| | | |
|---|---|---|
| 348,914 | Jackson | Sept. 7, 1886 |
| 899,659 | Craddock | Sept. 29, 1908 |
| 1,195,253 | Naslund | Aug. 22, 1916 |
| 1,479,028 | Cooke | Jan. 1, 1924 |

FOREIGN PATENTS

| | | |
|---|---|---|
| 777,986 | France | of 1934 |
| 960,463 | France | of 1950 |